United States Patent

[11] 3,612,832

[72] Inventors Amnon Goldstein
Forest Hills;
Fred M. Pintus, White Plains, both of N.Y.

[21] Appl. No. 18,434

[22] Filed Mar. 11, 1970

[45] Patented Oct. 12, 1971

[73] Assignee Decitron Communication Systems, Inc.
Brooklyn, N.Y.

[54] EMBOSSMENT READERS FOR IDENTIFICATION CARDS AND THE LIKE

13 Claims, 12 Drawing Figs.

[52] U.S. Cl. 235/61.11 E

[51] Int. Cl. G06k 7/10

[50] Field of Search 250/219 Q, 219 D; 235/61.11 R, 61.11 C, 61.11 E, 61.7 B; 340/149 A; 200/46

[56] References Cited

UNITED STATES PATENTS

| | | | |
|---|---|---|---|
| 2,366,827 | 1/1945 | Ayres | 235/61.11 C |
| 2,374,790 | 5/1945 | Terry | 235/61.11 C |
| 3,299,298 | 1/1967 | Schinner | 235/61.11 C |
| 3,463,890 | 8/1969 | Schinner et al. | 200/46 |

*Primary Examiner*—Daryl W. Cook
*Attorney*—Blum, Moscovitz, Friedman & Kaplan

ABSTRACT: A device capable of "reading" embossments on an identification card or the like. The device includes a scanning unit capable of scanning the embossments, for example, in an optical manner, so as to transmit signals corresponding to the configurations of the embossments. A positioning structure is provided for precisely positioning the embossments with respect to the scanner by directly engaging the embossments which are to be scanned. Thus, it is the embossments themselves which are engaged for determining the location of the embossments with respect to the structure which scans them.

INVENTOR.
AMNON GOLDSTEIN
FRED M. PINTUS
BY
Blum Moscovitz Friedman & Kaplan
ATTORNEYS FIG. 6
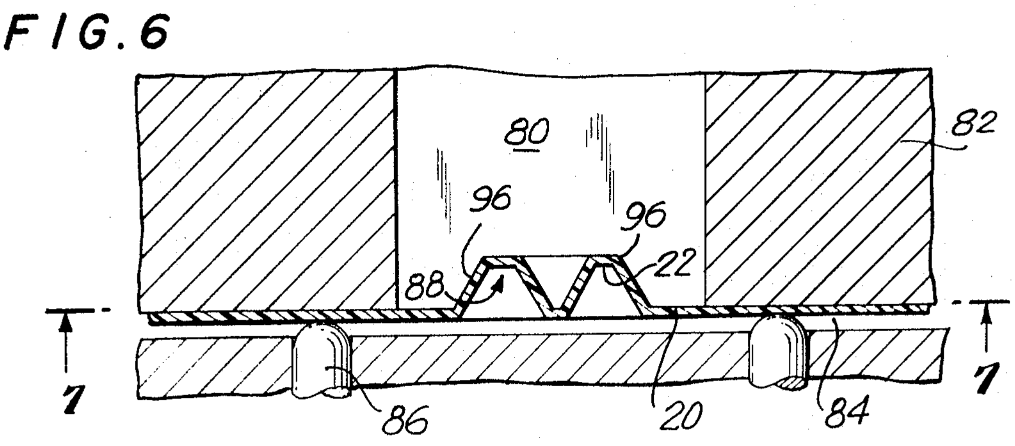
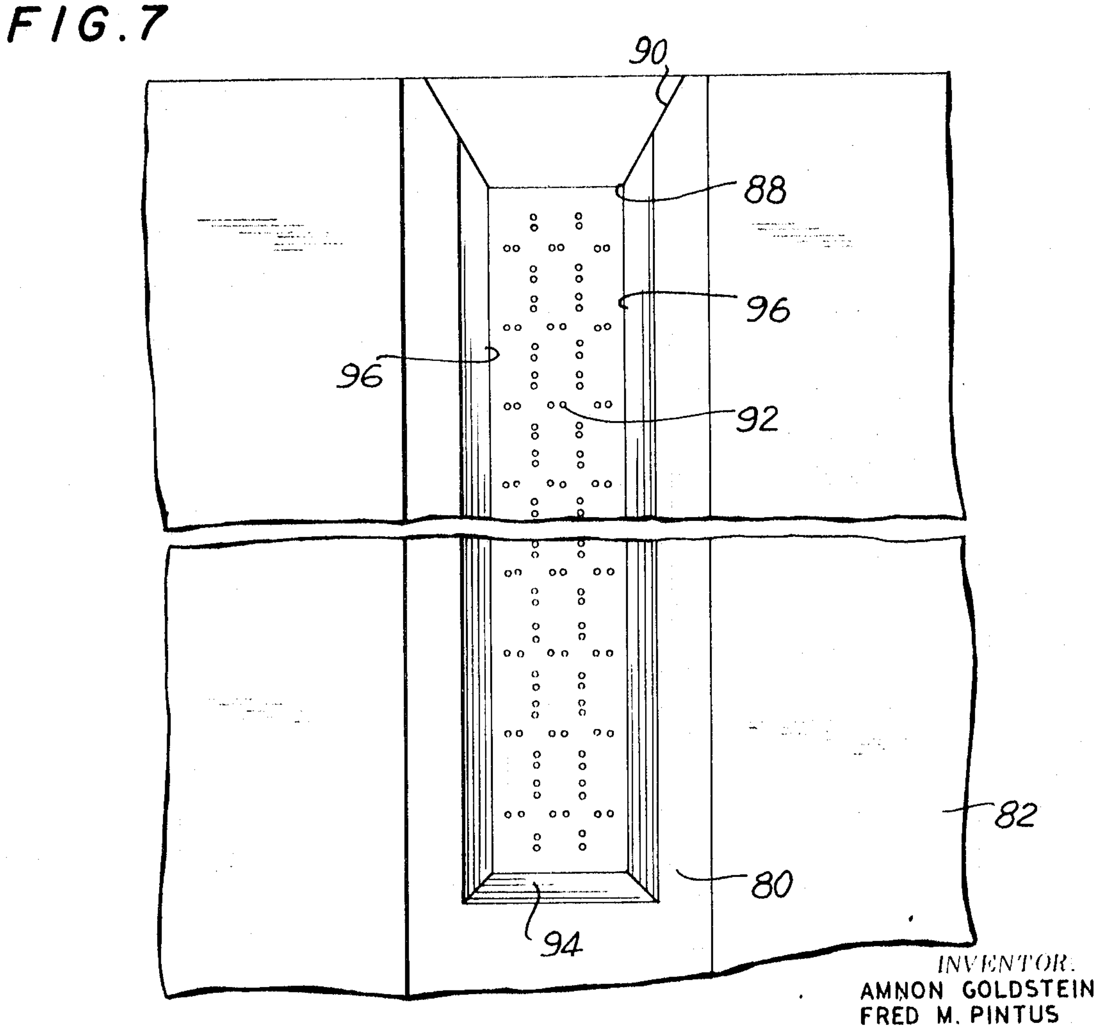
INVENTOR.
AMNON GOLDSTEIN
FRED M. PINTUS
BY
Blum, Moscovitz, Friedman & Kaplan
ATTORNEYS INVENTOR.
AMNON GOLDSTEIN
FRED M. PINTUS
BY
Blum, Moscovitz, Friedman & Kaplan
ATTORNEYS

EMBOSSMENT READERS FOR IDENTIFICATION CARDS AND THE LIKE

BACKGROUND OF THE INVENTION

The present invention relates to devices for scanning the configuration of embossments of identification cards and the like.

In order to record a transaction such as a commercial transaction with the use of embossed credit cards and the like, such cards may be introduced into a "reader" unit which is capable of transmitting to a centralized location, for example, signals corresponding to the embossments which identify the individual who owns the identification card, and in this way it is possible to identify a particular transaction with a particular individual.

Although devices of the above general type are in use, they suffer from the drawback of failing to position the embossments in the most accurate possible manner with respect to the structure which scans the embossments. Thus, for example, it is customary to rely upon the outside edge of the identification card for properly positioning the card in a device which will scan the embossments thereof. However, it is precisely these side edges of the card which become most rapidly worn, which are easily nicked, frayed, and the like, and which are subjected perhaps to the greatest amount of stresses and wear of the entire card during the normal handling thereof. The result is that embossments cannot be very precisely positioned with respect to a scanning unit when the same card is used over a long period of time. Further, the indicia on every card to be scanned may not have been embossed in precisely the same position relative to the edge thereof while cards supplied by different companies may have the indicia embossed in different positions on their cards. Thus, it does not infrequently happen that with conventional arrangements of this type either there are false readings, or there are readings which cannot identify the individual who owns the card, so that considerable inconvenience results to all of the parties.

SUMMARY OF THE INVENTION

It is accordingly a primary object of the present invention to provide structures which will avoid the above drawbacks.

In particular, it is an object of the invention to provide an arrangement which will position cards accurately without, however, relying upon the side or peripheral edge regions of the card for this purpose.

In particular, it is an object of the invention to provide an arrangement which is capable of utilizing the embossments themselves for the proper positioning thereof with respect to a scanner.

Furthermore, it is an object of the invention to provide a construction of this type which is characterized by great simplicity so that the cost of the structure is maintained low, while at the same time the structure operates very effectively to bring about any desired scanning of the embossments under conditions of the greatest possible accuracy in the positioning of the embossments with respect to the scanner.

According to the invention the device for "reading" the embossments includes a scanning means for scanning the embossments so as to transmit signals corresponding to the configuration of a series of embossments. A positioning means is provided for positioning the embossments with respect to the scanning means so that the embossments will be scanned thereby. According to the invention this positioning means engages the embossments themselves so that it is the embossments which are to be scanned which themselves are used for accurately positioning the embossments with respect to the scanner.

BRIEF DESCRIPTION OF THE DRAWINGS

The invention is illustrated by way of example in the accompanying drawings which form part of this application and in which:

FIG. 6 is a transverse sectional elevation of another embodiment of an assembly for accurately positioning embossments with respect to a scanner;

FIG. 7 is a fragmentary plan view taken along line 7—7 of FIG. 6 in the direction of the arrows;

DESCRIPTION OF THE PREFERRED EMBODIMENTS

Figure 1:
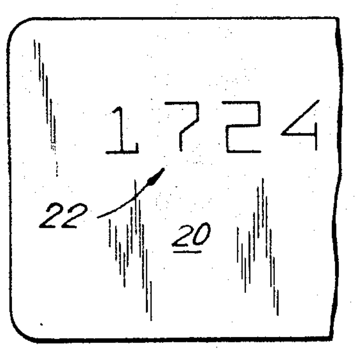
FIG. 1 is a fragmentary schematic representation of a card having embossments thereon for identifying the owner of the card.

Referring to FIG. 1, there is fragmentarily illustrated therein an identification card 20. The schematically illustrated card 20 is shown as having a series of characters 22 which in the illustrated example are in the form of numerals. In the illustrated example these numerals are embossments which extend upwardly beyond the top surface of the remainder of the card 20. These embossments form depressions on the rear face of the card. Such cards are well known, and of course they will be provided with identifying indicia to an extent greater than that illustrated in FIG. 1.

Figure 2:
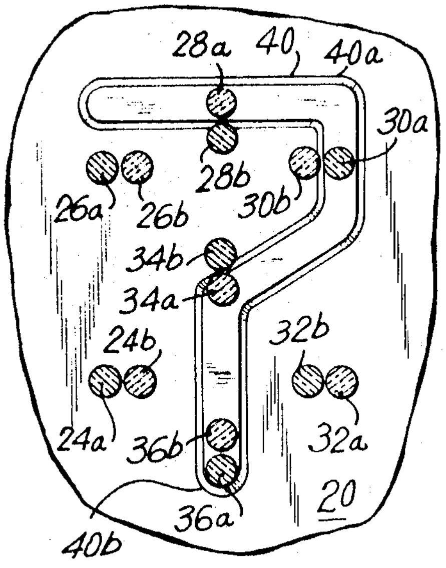
FIG. 2 is a fragmentary plan view showing one of the characters of FIG. 1 at an enlarged scale and schematically representing the manner in which one particular type of scanner is used for scanning the embossments so as to transmit signals corresponding to the configuration thereof.

Embossments of the type referred to above and shown in FIG. 1 can be "read" by different types of scanning devices. FIG. 2 schematically illustrates one type of fiber-optic scanning structure. Thus, a suitable matrix composed of one or more blocks which are not illustrated in FIG. 2 carries bundles of fiber s capable of conducting light to and from the characters which are to be scanned. As may be seen from FIG. 2, these bundles are composed of pairs of bundles *24a*, *24b*, *26a*, *28a*, *30a*, *30b*, *32a*, *32b*, *34a*, *34b* and *36a*, *36b*. Light is directed from any suitable source toward the surface of the card 20 by the fiber-optic elements *24b*, *26b*, *38b*, *30b*, *32b*, *34b*, and *36b*. Light is received by the fiber-optic elements *24a*, *26a*, *28a* , *30a*, *32a*, *34a* and *36a*, to be transmitted thereby to suitable signalling devices. When there is no embossment beneath the pairs of fiber-optic elements of the scanner, the light is reflected directly from the surface of the card 20 so as to send a signal that there is no part of any embossment at the particular location. On the other hand, if the fiber-optic elements are situated directly next to an embossment, the light will not be received or if received the extent of illumination is so small that the effect is the same as if no light were received. Thus, it will be seen, for example, that the light from element *28b* is completely blocked by the top surface of the embossment shown in FIG. 2, so that no light will be received by the element $28a$. The same is true of elements $34a$ $30a$ and $36a$. None of these elements will receive light, so that the "reader" will be able to decode the signals for the particular embossment and thus transmit a signal corresponding to the configuration of the character which is illustrated in FIG. 2. This character is of course the numeral 7 and has an upper flat surface 38 surrounded by sloping surface 40 which slopes down to the upper face of the card 20 from which light is reflected at those areas where there is no embossment.

Figure 3:
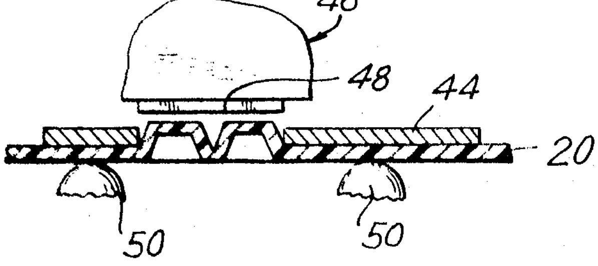
FIG. 3 is a schematic fragmentary transverse sectional elevation showing the manner in which an embossment such as that of FIG. 2 is positioned and scanned with the structure of the invention.

It is of course important to very precisely position the scanning elements with respect to the embossments so as to achieve accurate readings. This is achieved according to the invention in the manner shown schematically in FIG. 3. Thus, referring to FIG. 3 the card 20 is shown with its row of embossments positioned in the slot of a guide 44 which forms the positioning means of this embodiment of the invention. The character shown in this sectional view of FIG. 3 corresponds to the character in FIG. 2 and it will be noted that the guide 44 has a thickness which is no greater than the depth of the embossment. FIG. 3 shows directly over the embossment the scanning means 46 provided with a lower region 48 where the several fiber-optic elements terminate for sensing the presence or absence of embossments. The card 20 is urged against the lower surface of the guide 44, which forms the positioning means of this embodiment, by spring-pressed bodies 50 which are schematically shown in FIG. 3.

Figure 4:
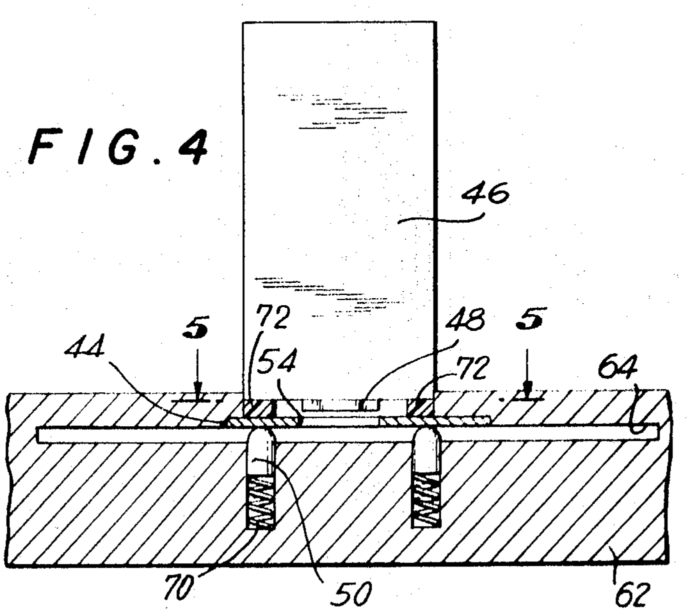
FIG. 4 is a transverse sectional elevation taken along line 4—4 of FIG. 5 in the direction of the arrows and showing the manner in which an arrangement such as that of FIG. 3 is incorporated into a unit for scanning the embossments.
Figure 5:
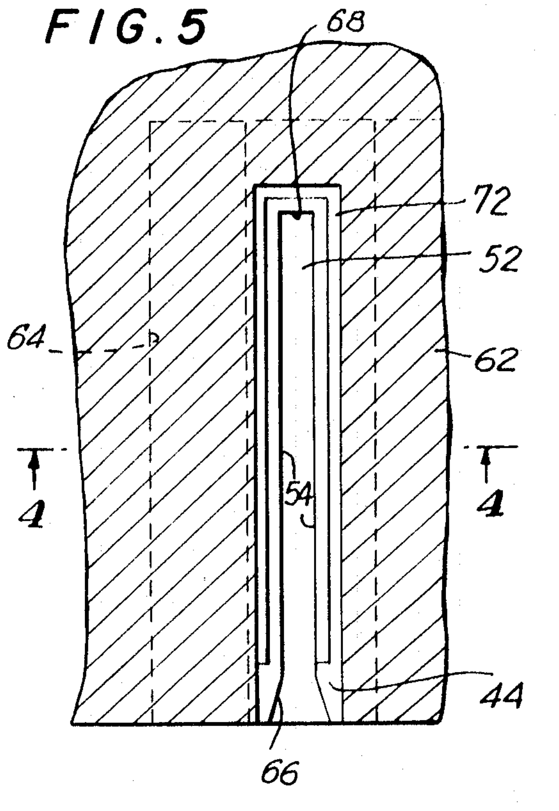
FIG. 5 is a sectional plan view taken along line 5—5 of FIG. 4 in the direction of the arrows and showing further details of the structure.

Referring to FIGS. 4 and 5 it will be seen that the guide 44 is in the form of a thin strip of metal formed with the elongated positioning slot 52 defined between the longitudinal side edges 54 of the slot 52. These side edges will engage the sloping surface portions 40*a* and 40*b* designated in FIG. 2, these surface portions being situated at opposed extremities of the embossments. Thus, the edges 54 of the guide 44 of the positioning means of the invention will directly engage the embossments themselves for precisely positioning them within the guide with respect to the scanning means 46.

The card is received by being horizontally introduced to the open end of a flat rectangular cutout 60 in any suitable supporting structure 62 schematically shown in FIGS. 4 and 5. The guide 44 is fixed in any suitable way to the supporting structure 62 extending across the lower region of an elongated slot 64 which is formed in the structure 62 and which has the configuration shown most clearly in FIG. 4. The guide member 44 which may be made of a thin strip of metal, for example is fixed directly to the supporting structure 62 in the manner shown in FIG. 4 in any manner which will leave the bottom surface of the guide 44 completely free to engage the upper surface of the card 20 with the embossments thereof received in the slot 52. It will be noted that the slot 52 has an open end where the guide 44 is provided with an inlet 66 tapered as indicated in FIG. 5 to facilitate introduction of the embossments. The first embossment will engage the inner end 68 of the slot 52 so as to properly position the entire series of embossments longitudinally along the scanning means 46. The members 50 are urged upwardly as by the springs 70 schematically shown in FIG. 4. The upper surface of the guide 44 may carry strip 72 of U-shaped configuration formed of tape or soft rubber arranged as shown most clearly in FIG. 5 for engaging the lower end of the scanner 46 so as to accommodate the latter precisely to the guide 44 and to provide an enlarged light chamber between said scanner and guide.

The manner in which the above-described structure is used is believed to be clear. All the operator need do is take a card and introduce it with the row of embossments advancing along the slots 52 until the first of the row of embossments engages the end 68 of the slot 52. The spring-pressed bodies 50 will reliably maintain the upper surface of the card 20 against the lower surface of the guide 44, and since the latter has a thickness no greater than that of the depth of the embossments, the upper surfaces thereof will become precisely situated directly beneath the scanner to be read by the elements thereof. Because the edges 54 of the slot 52 of the guide 44 coact directly with the embossments themselves, and more precisely with the intersection between the sloping surfaces thereof and the top face of the card 20, the greatest possible accuracy in the positioning of the embossments laterally, or, in other words, perpendicularly with respect to the row of characters, with respect to the scanner is achieved, and of course the engagement of the first of the characters with the end 68 will position the embossments longitudinally in an accurate manner with respect to the scanner, so that in this way the positioning means 44 of the invention coacts directly with the embossments themselves for precisely positioning them with respect to the scanning means 46. Thus, the fact that the edges of the card become nicked or otherwise worn or frayed is immaterial since reliance is made only upon the embossments themselves for the accuracy in the positioning of the embossments with respect to the structure which will scan the embossments.

FIGS. 6 and 7 illustrate an embodiment of the invention which does not require a separate positioning strip 44 to form the positioning means. According to this embodiment the reading or scanning means 80 is carried by any suitable supporting structure 82 which is formed with the card-receiving slot 84 cable of receiving a card 20 precisely as described above. The structure 82 has the spring-pressed bodies 86 which operate in the same way as the bodies 50 to press the card 20 upwardly so as to accurately determine its elevation.

According to this embodiment the scanning means 80 is itself formed with an elongated slot 88 which receives the embossments forming the characters 22. This slot 88 has in cross section the configuration of a trapezoid whose opposite sides are equal and make the same angles with the bases of the trapezoid, and the slope of these sides is the same as the slope of the embossments, as is apparent from FIG. 6 The slot 88 also has a tapered inlet 90, as is apparent from FIG. 7. FIG. 7 diagrammatically shows the arrangement of the array of scanning elements 92 which may be pairs of fiber-optic elements as described above in connection with FIG. 2.

Thus, with this embodiment the operator will simply introduce the row of embossments which are to be scanned into the slot 88. The tapered inlet 90 will of course facilitate the introduction of the embossments into the slot 88. The first of the series of embossments will again engage the inner closed end 9 of the slot 88. Thus, with this embodiment the positioning means is formed by the opposed sloping side edges 96 which define the elongated slot 88 and which slidably engage the sloping opposed terminal regions of the characters such as the regions 40*a* and 40*b* indicated in FIG. 2. In this way it is possible with this embodiment not only to eliminate a separate strip but also to provide a direct keying of the embossments to the scanning means 80 so that the greatest possible precision is assured.

Figure 8:
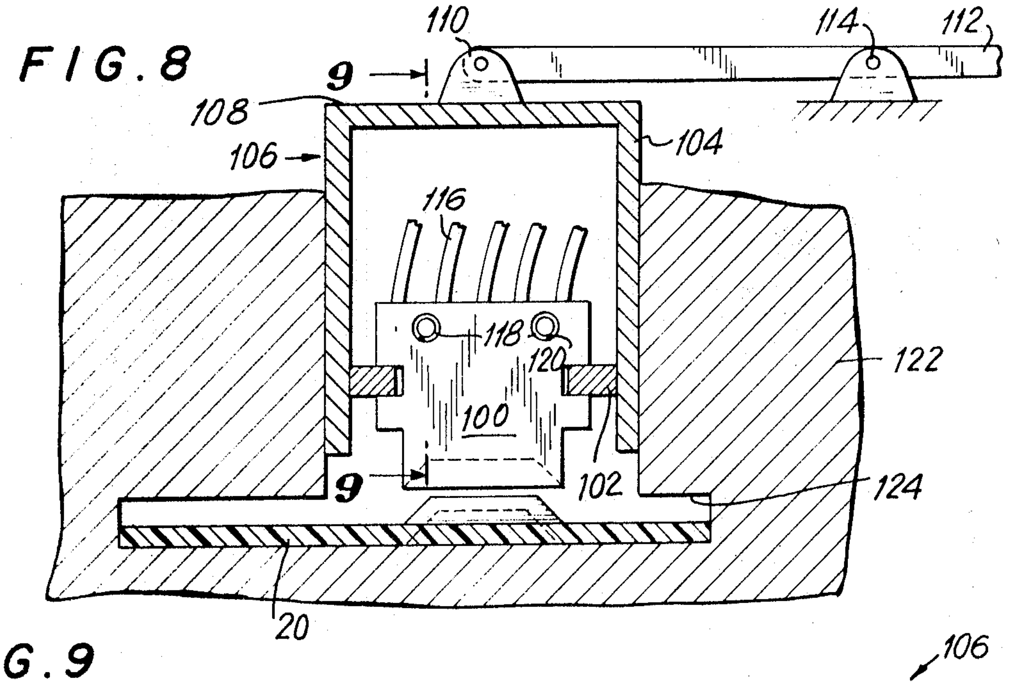
FIG. 8 is a transverse sectional elevation of a further embodiment of an assembly according to the invention.
Figures 9, 10, 11, 12:
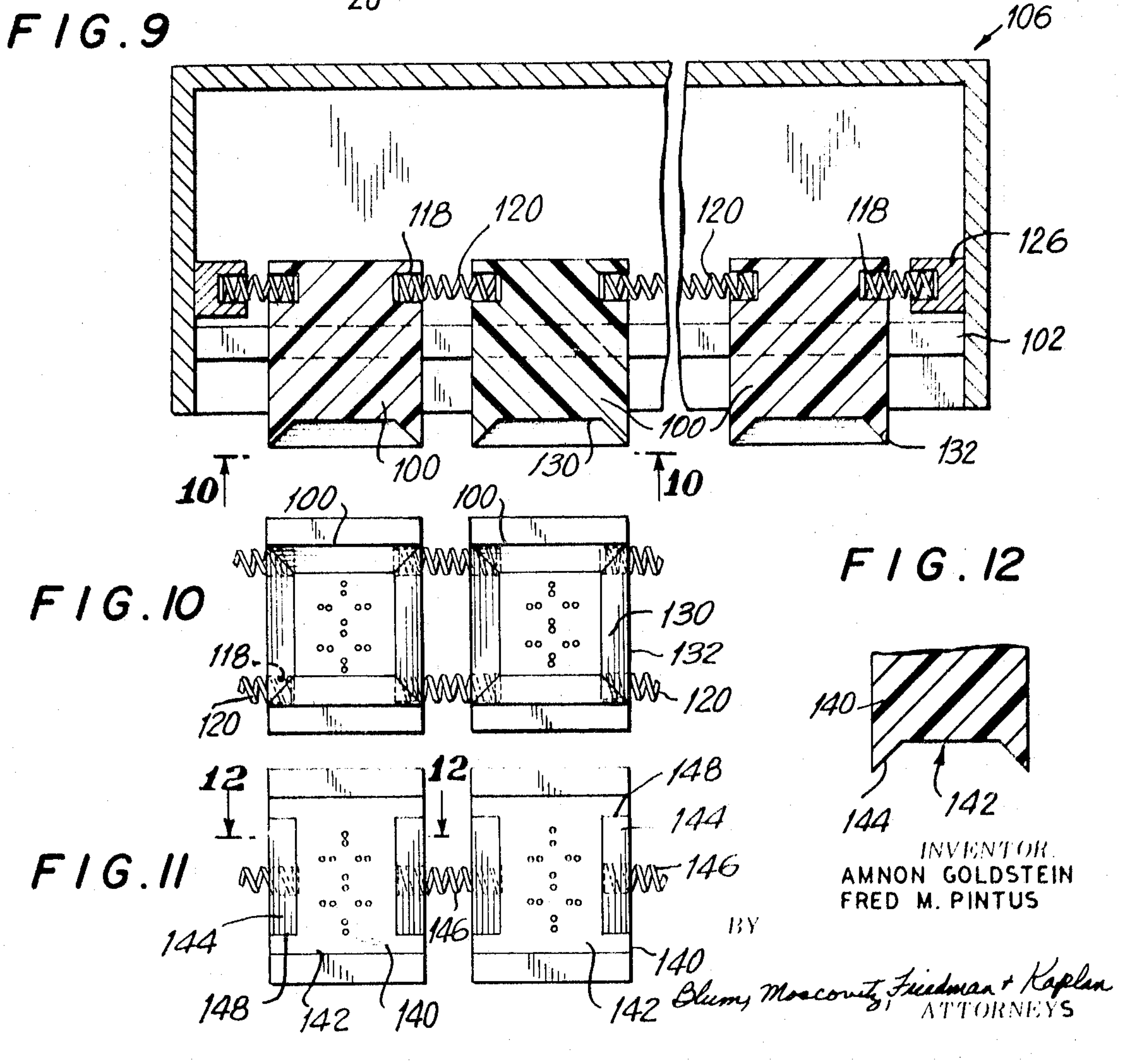
FIG. 9 is a longitudinal sectional elevation taken along line 9—9 of FIG. 8 in the direction of the arrows and showing fragmentarily the longitudinal arrangement of the scanning blocks.
FIG. 10 is a view of a pair of adjoining blocks of FIGS. 8 and 9, taken along line 10—10 of FIG. 9 in the direction of the arrows.
FIG. 11 is a view of a pair of adjoining blocks of an alternate construction to that of FIG. 10.
FIG. 12 is a longitudinal sectional view taken along line 12—12 in the direction of the arrows.

With the embodiment of FIGS. 6 and 7 while the scanning means will key itself directly to the embossments, the positioning is brought about by way of a pair of opposed parallel edges 96 which define the slot of the positioning means which forms part of the scanning means itself in the embodiment of FIGS. 6 and 7. The embodiment of FIGS. 8–10 shows an arrangement where each of the individual characters is individually keyed to a matrix block which carries a plurality of fiber-optic elements for "reading" the character which is keyed to the particular block. Referring to FIGS. 8–10 it will be seen that the several matrix blocks 100 are formed with opposed parallel grooves which receive guide rails 102 on which the blocks 100 are longitudinal slidable. The rails 102 are carried by a pair of opposed walls 104 of a carrier structure 106 which has a top wall 108 pivoted by a bracket 110 to an operating lever 112 in the example illustrated. This lever 112 is pivoted on a pin 114 so that the operator can turn the lever 112 in a counterclockwise direction, as viewed in FIG. 8 to lower the scanning blocks 100 and in a clockwise direction to raise the scanning blocks 100. FIG. 8 schematically illustrates the extensions 116 of the fiber-optic elements to a decoding unit which responds to the signals which are transmitted.

Referring to FIG. 9 it will be seen that the opposed side surfaces of the several blocks 100 are formed with aligned bores 118 which receive compressed springs 120 so that these springs will automatically space the blocks 100 by predetermined small increments apart from each other in initial positions of rest.

The carrier 106 is supported for vertical movement in guide structure of a supporting assembly 122 which is fragmentarily and schematically illustrated. This assembly 122 is formed with the card-receiving slot 124 which roughly approximates the exterior dimensions of the card. It will be noted from FIG. 9 that the end walls of the carrier 106 have blocks 126 for receiving the end springs 120.

Referring to FIG. 10 it will be seen that each of the blocks 100 is formed at its lower end with a character-receiving recess 130 which has the configuration of a truncated pyramid. Thus, each recess 130 is defined by four intersecting lips 132 of triangular cross section having sloping surfaces conforming to the slopes of the characters and these lips define a square or rectangle at the bottom end of each of the blocks 100. The arrangement of the fiber-optic scanning elements in each block is apparent from FIG. 10.

Thus, in order to use the structure of FIGS. 8–10, the operator need only introduce the card 20 in the manner shown in FIG. 8. Then the operator will raise the outer end of the lever 112 so as to lower the blocks onto the embossments, and the blocks are supported in a longitudinally "floating" manner by the guide rails 102 so that they longitudinally align themselves with the several characters which form the embossments, and there is a sufficient lateral play to provide for the slight lateral "floating" which is required. In this way with this embodiment each of the matrix blocks will automatically key itself to the particular embossment. After the signal has been transmitted the operator need only move the outer end of the lever 112 down so as to raise the blocks 100 away from the embossments. Then the card 20 can be removed, and of course the springs 120 will act to automatically return the blocks 100 to their initial positions of rest.

The features of the foregoing embodiments of the arrangement according to the invention can be combined, if desired. Thus, the alignment arrangement for an embossed card reader could include both the guide 44 of FIGS. 3–5 and longitudinally "floating" blocks similar to those disclosed in FIGS. 8–10, as more particularly shown in FIGS. 11 and 12. Referring to FIGS. 11 and 12, the blocks 140 are provided with opposed parallel grooves which receive guide rails in the same manner as depicted in FIGS. 8 and 9 except that said grooves and guide rails are dimensioned with a minimum of lateral play so that the blocks are supported in a longitudinally "-floating" manner without any lateral "floating". Each of the blocks 140 is formed at its lower end with a character-receiving recess 142 defined by a pair of opposed lips 144 of triangular cross section having sloping surfaces conforming to the slopes of the characters. Blocks 140 would also be provided with the aligned bores on the sides thereof adjacent lips 144 adapted to receive springs 146 as previously discussed in connection with bores 118 and springs 120 of FIGS. 8 and 9.

The blocks 140 shown in FIGS. 11 and 12 may be mounted in a carrier structure such as is shown in FIG. 8 aligned for registration with a guide such as guide 44 of FIGS. 3–5 fixedly mounted on the supporting assembly. In order to use this embodiment, the operator need only introduce the card into the device in the manner shown in FIG. 4, relying on the guide to provide lateral alignment of the embossing as well as initial longitudinal alignment due to the engaging of the first numeral against the end of the slot in the guide. Final longitudinal alignment is achieved by lowering the blocks onto the embossments so that they longitudinally align themselves with the several characters which form the embossments. The ends 148 of the lips 144 preferably terminate inwardly of the side of the blocks 144 so as to avoid interference between the guide and said lips.

Thus, in this embodiment, the card is aligned by the cooperation of a guide and lips provided on displaceable "reading" blocks. It should be noted that an embossing guide without an end could be provided at the entrance to receiving slot 124 of FIG. 8 so as to insure insertion of the card in substantial registration with the blocks 100.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a device for "reading" embossments on a card, scanning means for scanning the embossments, and positioning means for engaging the embossments themselves for accurately positioning the embossments with respect to said scanning means to be scanned thereby.

2. The combination of claim 1 and wherein said positioning means includes an elongated guide formed with an elongated guide slot which is open at one end, said slot being defined between longitudinal edges of said positioning means which directly engage a row of embossments for accurately positioning the latter in said slot between said longitudinal edges thereof, said scanning means being located directly next to said positioning means substantially bridging said slot thereof for scanning the embossments positioned between said edges.

3. The combination of claim 2 and wherein said guide is of a thickness no greater than the depth of the embossments.

4. The combination of claim 2 and wherein said guide has an inwardly tapering portion at said open end of said slot for facilitating entry of the embossments between the longitudinal side edges of said slot.

5. The combination of claim 2 and wherein said scanning means includes a plurality of individual scanning blocks for a plurality of embossments, respectively, said positioning means further including a pair of spaced positioning lips projecting from each of said blocks toward said guide and substantially bridging the slot thereof for directly engaging an embossment to key the latter to one of said blocks.

6. The combination of claim 5 and wherein mounting means are provided for supporting said plurality of individual scanning blocks while permitting the relative displacement thereof longitudinally relative to said guide slots.

7. The combination of claim 1 and wherein said positioning means includes a positioning lip forming part of the scanning means itself for directly engaging an embossment for keying the embossment and scanning means directly to each other.

8. The combination of claim 7 and wherein there are a pair of said lips extending parallel to each other to define between themselves an elongated space for receiving a series of embossments with the lips engaging opposed portions of said embossments for keying the scanning means and embossments which are to be scanned thereby directly to each other.

9. The combination of claim 7 and wherein said scanning means includes a plurality of individual scanning blocks for a plurality of embossments, respectively, each of said blocks terminating in an end face formed with a depression surrounded by a positioning lip which forms the positioning means for directly engaging an embossment to key the latter to one of said blocks.

10. The combination of claim 9 and wherein said lip is of a rectangular configuration.

11. The combination of claim 10 and wherein said lip is of a triangular cross section providing said recess with the configuration of a truncated pyramid.

12. The combination of claim 9 and wherein mounting means are provided for said plurality of individual scanning blocks adapted to permit both longitudinal and lateral relative displacement of said scanning blocks for the positioning thereof in registration with said embossments.

13. The combination of claim 8 and wherein said lips are of a triangular cross section having oppositely sloping surfaces directed toward each for engaging sloping end surface portions of the embossments.

Disclaimer 3,612,832.—*Amnon Goldstein*, Forest Hills, and *Fred M. Pintus*, White Plains, N.Y. EMBOSSMENT READERS FOR IDENTIFICATION CARDS AND THE LIKE. Patent dated Oct. 12, 1971. Disclaimer filed Jan. 27, 1975, by the assignee, *Decicom Systems, Inc.*

Hereby enters this disclaimer to claims 1, 2, 4, 7 and 8 of said patent.

[*Official Gazette April 8, 1975.*]